United States Patent
Krzymien et al.

(10) Patent No.: US 9,912,504 B2
(45) Date of Patent: Mar. 6, 2018

(54) SYSTEM AND METHOD FOR MULTIPLE CARRIER TRANSMISSION

(71) Applicant: Futurewei Technologies, Inc., Plano, TX (US)

(72) Inventors: Lukasz Krzymien, Rolling Meadows, IL (US); Vipul Desai, Palatine, IL (US); Weimin Xiao, Hoffman Estates, IL (US); Jialing Liu, Palatine, IL (US)

(73) Assignee: Futurewei Technologies, Inc., Plano, TX (US)

(*) Notice: Subject to any disclaimer, the term of this patent is extended or adjusted under 35 U.S.C. 154(b) by 265 days.

(21) Appl. No.: 14/808,844

(22) Filed: Jul. 24, 2015

(65) Prior Publication Data
US 2016/0037524 A1 Feb. 4, 2016

Related U.S. Application Data

(60) Provisional application No. 62/031,656, filed on Jul. 31, 2014.

(51) Int. Cl.
*H04W 72/04* (2009.01)
*H04L 1/18* (2006.01)
*H04L 27/26* (2006.01)

(52) U.S. Cl.
CPC ........ *H04L 27/2601* (2013.01); *H04L 1/1812* (2013.01); *H04W 72/042* (2013.01); *H04W 72/0453* (2013.01)

(58) Field of Classification Search
None
See application file for complete search history.

(56) References Cited

U.S. PATENT DOCUMENTS 8,737,303 B2 * 5/2014 Kim ............... H04B 7/063
370/328
2010/0254327 A1 * 10/2010 McBeath ......... H04L 1/1812
370/329

(Continued)

FOREIGN PATENT DOCUMENTS

CN 101631009 A 1/2010
CN 102036314 A 4/2011

(Continued)

OTHER PUBLICATIONS

PCT International Search Report and Written Opinion, PCT/CN2015/085443, Applicant: Huawei Technologies Co., Ltd., dated Oct. 29, 2015, 11 pages.

(Continued)

*Primary Examiner* — Vinncelas Louis
(74) *Attorney, Agent, or Firm* — Slater Matsil, LLP

(57) ABSTRACT

A method includes transmitting, by a communications controller to a user equipment (UE), a first data block on a first carrier and transmitting, by the communications controller to the UE, a first downlink control information (DCI) to initiate a hybrid automatic repeat request (HARQ) process associated with the first data block. The method also includes retransmitting, by the communications controller to the UE, the first data block and transmitting, by the communications controller to the UE, a second DCI, where the second DCI includes a first transmission indicator and an indicator of the first carrier, and where the second DCI continues the HARQ process.

18 Claims, 14 Drawing Sheets

(56) References Cited

U.S. PATENT DOCUMENTS

| | | | |
|---|---|---|---|
| 2011/0019776 A1* | 1/2011 | Zhang | H04L 5/0023 375/340 |
| 2012/0320853 A1 | 12/2012 | Kwon et al. | |
| 2014/0029552 A1* | 1/2014 | Lv | H04L 1/1887 370/329 |
| 2014/0092784 A1 | 4/2014 | Khayrallah et al. | |
| 2015/0049723 A1 | 2/2015 | Fong et al. | |

FOREIGN PATENT DOCUMENTS

| | | |
|---|---|---|
| CN | 102124772 A | 7/2011 |
| WO | 2009157859 A2 | 12/2009 |
| WO | 2010050688 A2 | 5/2010 |

OTHER PUBLICATIONS

Qualcomm Europe, "Completing the Scrambling Details in the Specifications," 3GPP TSG RANI #52, R1-080652, Feb. 11-15, 2008, 4 pgs.

Panasonic, "Effect of set S on CQI reports," 3GPP TSG-RAN WG1 Meeting #52bis, R1-081202, Mar. 31-Apr. 4, 2008, 3 pgs.

Ericsson, "Carrier Agregation in LTE-Advanced," TSG-RAN WG1 #53bis, R1-082468, Jun. 30-Jul. 4, 2008, 6 pgs.

Sharp, "HARQ Process Mapping Considering Carrier Indication," 3GPP TSG RAN WG1 Meeting #58bis, R1-094019, Oct. 12-16, 2009, 2 pgs.

* cited by examiner

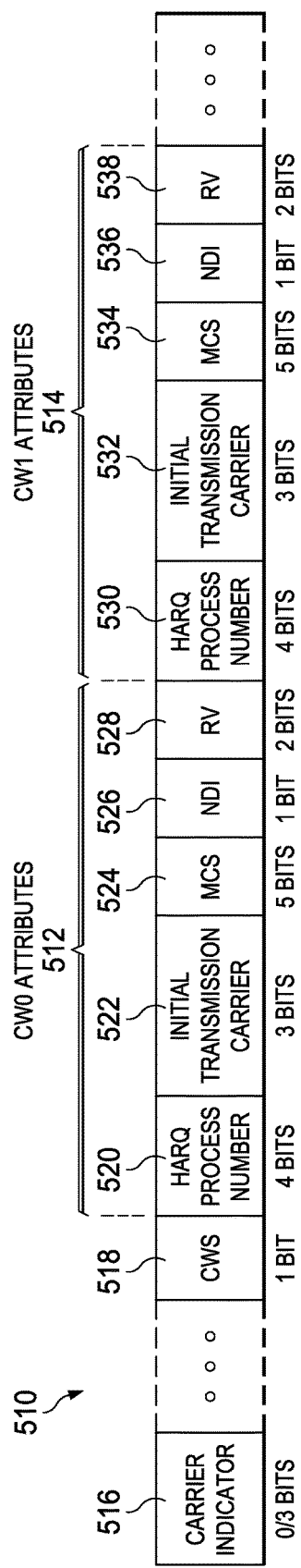
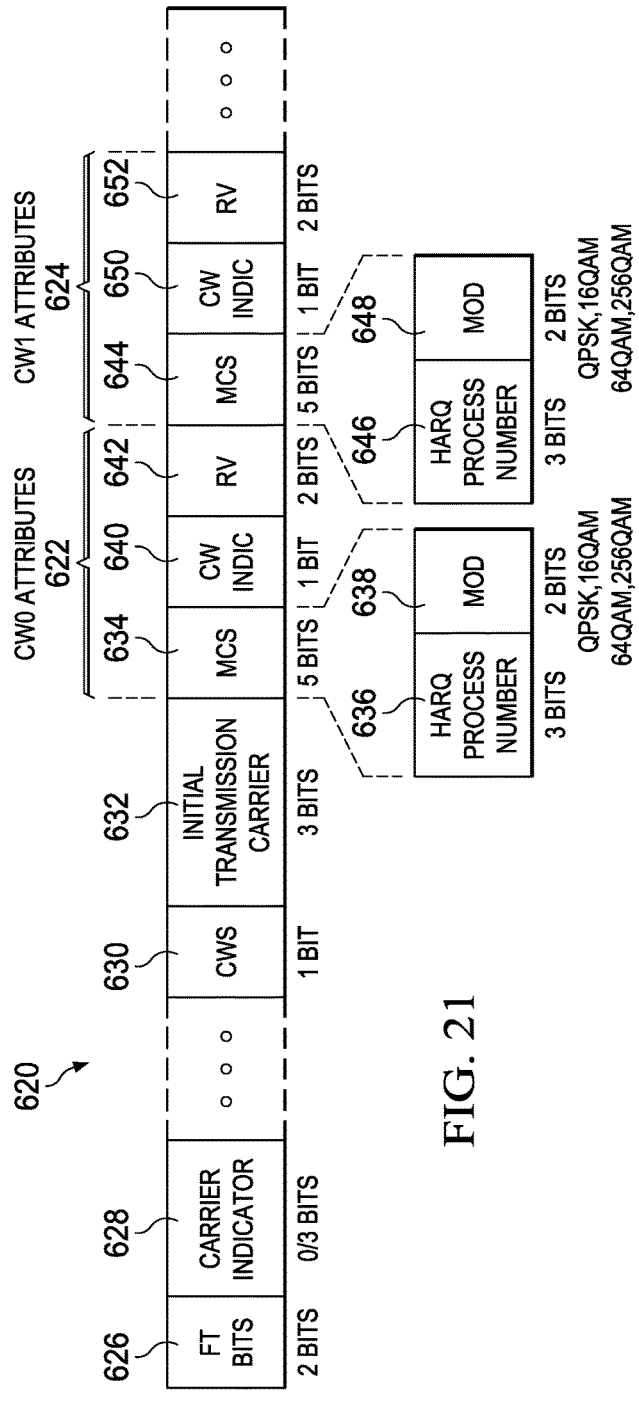
FIG. 19
FIG. 21

SYSTEM AND METHOD FOR MULTIPLE CARRIER TRANSMISSION

This application claims the benefit of U.S. Provisional Application Ser. No. 62/031,656 filed on Jul. 31, 2014, and entitled "System and Method for Transmissions and Retransmissions across Multiple Carriers," which application is hereby incorporated herein by reference.

TECHNICAL FIELD

The present invention relates to a system and method for wireless communications, and, in particular, to a system and method for multiple carrier transmission.

BACKGROUND

The amount of wireless data being transferred is increasing. Cellular communications systems may utilize licensed spectrums (Bands), where transmissions are tightly controlled by a network. Unlicensed bands may be used for cellular transmissions along with licensed bands. Unlicensed bands may be less reliable, because of the presence of interfering transmissions from other standards, such as wireless local area network (WLAN), WiFi, Bluetooth, and cordless phones (digital and analog), which transmissions cannot be controlled by cellular nodes.

A wireless system may use a licensed spectrum component, e.g. a cellular system, such as Long Term Evolution (LTE), and an unlicensed spectrum. Carrier aggregation (CA) facilitates user equipments (UEs) receiving signals on two or more carriers.

SUMMARY

An embodiment method includes transmitting, by a communications controller to a user equipment (UE), a first data block on a first carrier and transmitting, by the communications controller to the UE, a first downlink control information (DCI) to initiate a hybrid automatic repeat request (HARQ) process associated with the first data block. The method also includes retransmitting, by the communications controller to the UE, the first data block and transmitting, by the communications controller to the UE, a second DCI, where the second DCI includes a first transmission indicator and an indicator of the first carrier, and where the second DCI continues the HARQ process.

An embodiment method includes receiving, by a user equipment (UE) from a communications controller, a first data block on a first carrier and receiving, by the UE from the communications controller, a first downlink control information (DCI), where the first DCI includes a first hybrid automatic repeat request (HARQ) process associated with the first data block. The method also includes receiving, by the UE from the communications controller, a second data block and receiving, by the UE from the communications controller, a second DCI including a second HARQ process associated with the second data block, where the second DCI includes a first transmission indicator and an indication of the first carrier.

An embodiment communications controller includes a processor and a non-transitory computer readable storage medium storing programming for execution by the processor. The programming includes instructions to transmit, to a user equipment (UE), a first data block on a first carrier and transmit, to the UE, a first downlink control information (DCI) to initiate a hybrid automatic repeat request (HARQ) process associated with the first data block. The programming also includes instructions to retransmit, to the UE, the first data block and transmit, to the UE, a second DCI, where the second DCI includes a first transmission indicator and an indicator of the first carrier, and where the second DCI continues the HARQ process.

An embodiment user equipment (UE) includes a processor and a non-transitory computer readable storage medium storing programming for execution by the processor. The programming includes instructions to receive, from a communications controller, a first data block on a first carrier and receive, from the communications controller, a first downlink control information (DCI), where the first DCI includes a first hybrid automatic repeat request (HARQ) process associated with the first data block. The programming also includes instructions to receive, from the communications controller, a second data block and receive, from the communications controller, a second DCI including a second HARQ process associated with the second data block, where the second DCI includes a first transmission indicator and an indication of the first carrier.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 19 illustrates an additional embodiment DCI;

FIG. 21 illustrates embodiment DCIs for initial and subsequent transmissions;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or not. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
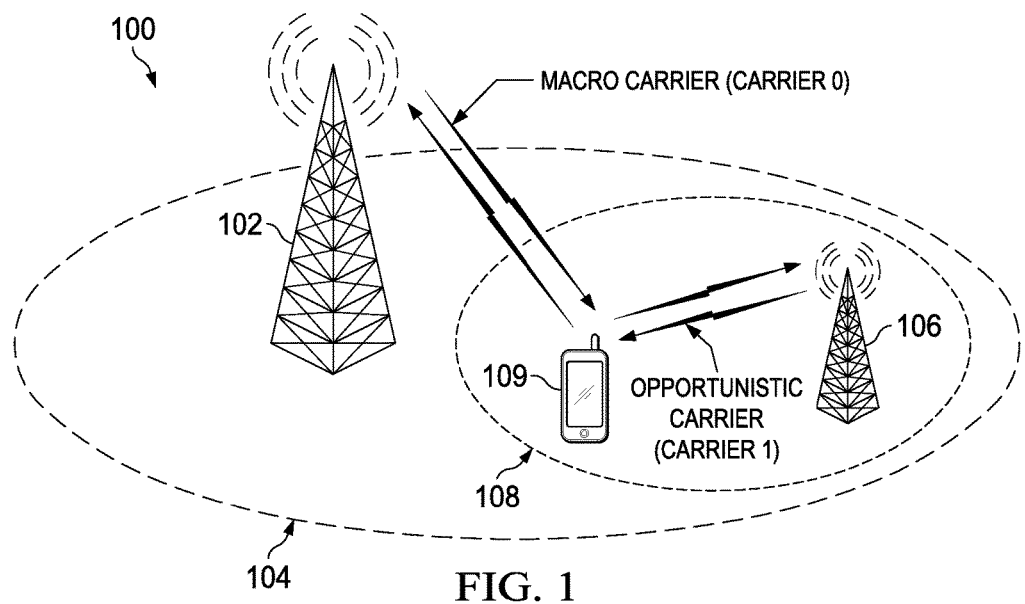
FIG. 1 illustrates a diagram of a wireless network for communicating data.

FIG. 1 illustrates network 100 for communicating data. Network 100 includes communications controller 102 having a coverage area 104, which operates on a macro carrier in a macro cell. Network 100 also has communications controller 106 having coverage area 108, which operates on an opportunistic carrier in a small cell. An opportunistic carrier is a carrier which is not always available. User equipment (UE) 109 is in both coverage area 104 and coverage area 108, and may communicate with either communications controller 102 or communications controller 106. One UE is depicted, but many more may be present. Communications controllers 102 and 106 may be any components capable of providing wireless access by establishing uplink and/or downlink connections with UE 109, such as a base station, a NodeB, an enhanced nodeB (eNB), an access point, a picocell, a femtocell, relay node, and other wirelessly enabled devices. UE 109 may be any component capable of establishing a wireless connection with communications controllers 102 and 106, such as cell phones, smart phones, tablets, sensors, etc. Network 100 may include a backhaul network (not pictured), which may be any component or collection of components that allow data to be exchanged between communications controllers 102 and 106 and a remote end. In some embodiments, the network 100 may include various other wireless devices, such as relays, etc.

UE 109 may switch carriers, for example when one carrier becomes unavailable in the middle of a transmission. In one example, the opportunistic carrier is in an unlicensed band, and is shared with other systems operating within that band, such as wireless local area network (WLAN) and Bluetooth. In another example, UE 109 switches carriers when the channel conditions for the carrier being used become unfavorable, for example when the reception of a carrier is blocked. In an additional example, UE 109 changes channels based on an on/off mechanism in a cell for power consumption reduction and interference reduction in a network. Alternatively, the UE switches carriers due to load balancing features or interference coordination, where some carriers may be shut off to reduce the impact of interference on the system.

Figure 2:
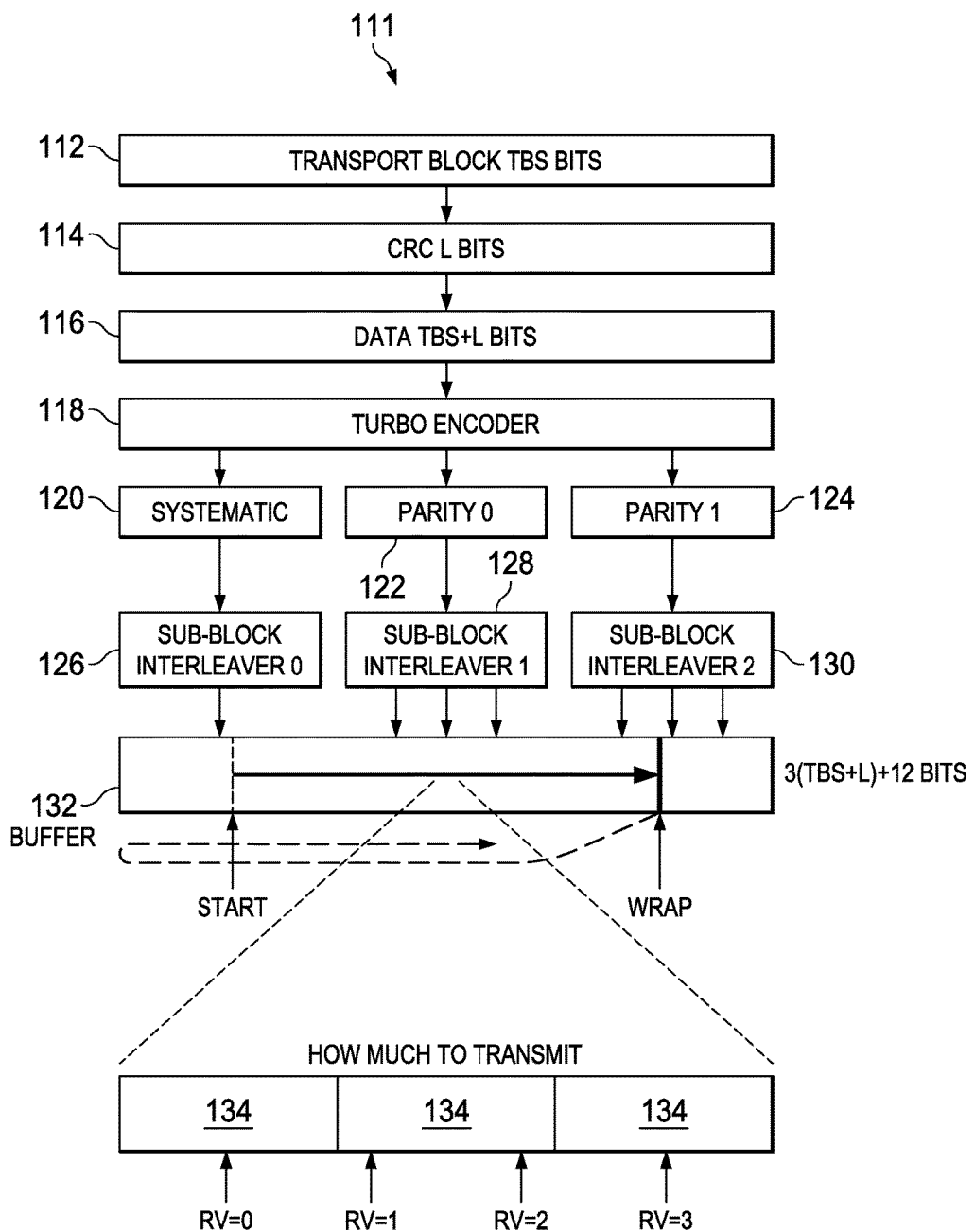
FIG. 2 illustrates a flowchart for an embodiment method of hybrid automatic repeat request (HARQ) encoding.

FIG. 2 illustrates flowchart 111 for a method of coding and hybrid automatic repeat request (HARQ) for downlink (DL) transmission in a physical downlink shared channel (PDSCH). In step 112, there is a transport block (TB) with transport block size (TBS) bits of information or data.

Then, in step 114, a parity sequence is generated by cyclic redundancy check (CRC) code applied to the TB. The CRC parity sequence has L bits. In one example, L is 24.

In step 116, the parity sequence is appended to the transport block, where B=TBS+L is the size of the transport block plus the CRC parity sequence, which is the total data size.

In step 118, rate 1/3 turbo encoding is performed. When size of B is less than or equal to the largest turbo interleaver size in the turbo encoder, no segmentation is used. When no sequence of bits is inserted before encoding, the B bit sequence is encoded to produce a 3B+12 bit sequence, where the 12 additional bits are due to tail bit insertion, with 6 tail bits inserted per constituent encoder. The encoded output may be referred to as a codeword.

The sequence is split among systematic block 120, parity block 122, and parity block 124 to sub-block interleaver 126, sub-block interleaver 128, and sub-block interleaver 130, respectively. Each sub-block interleaver operates on B+4 encoded bits.

The outputs of the sub-block interleavers are aggregated in aggregation block 132, which yields 3(TBS+L)+12 bits. The rate matching procedure determines a starting point in aggregation block 132 (buffer), which is a function of the redundancy version (RV) 134, which has values of 0, 1, 2, and 3. The rate matching procedure has a wrap point, which may be 3B+12, but may be lower, for example when there are restrictions based on the soft buffer size at the UE. The output of the rate matching procedure is a sequence of G bits, where the first bit is determined by the starting point in the buffer, followed successively by the bits in the buffer until the wrap point. Bits starting from position 0 are then pulled.

Figure 3:
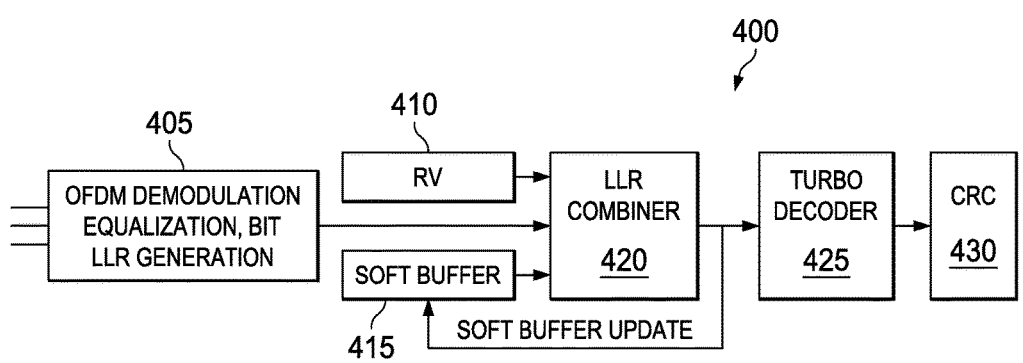
FIG. 3 illustrates a flowchart for an embodiment method of HARQ decoding.

HARQ mechanisms may reduce the probability of transmission errors for data packets or transport blocks. In one example, a UE stores a received transmission corresponding to a particular transport block which has been incorrectly decoded. FIG. 3 illustrates flowchart 400 for an embodiment method of decoding. Initially, in step 405, orthogonal frequency division multiplexing (OFDM) demodulation, equalization, and bit log-likelihood ratio (LLR) generation are performed. These LLRs are denoted as current LLRs.

LLRs are stored in soft buffer 415. Stored and current LLRs are combined in LLR combiner 420 according to RV 410. RV 410 determines with which part of the soft buffer the current LLRs are to be combined. When two or more LLRs overlap in position, they may be added. The UE may also store the output of LLR combiner 420 in soft buffer 415.

The combined LLRs are passed to turbo decoder 425, which estimates information bits.

Then, the decoded B information bits are passed to CRC block 430 to assess the correctness of the decoded data. When the CRC block indicates correct decoding, the decoded TB bits are passed to higher layers, and the portion of the soft buffer corresponding to the decoded data may be flushed and used for a new TB transmission. When the syndrome generated by the CRC processing of the decoded information bits and appended parity sequence is not equal to zero, there is an indication of incorrect decoding.

The UE may feed back the decoding status with an acknowledgment (ACK) or a negative acknowledgment (NACK) to the communications controller, for example after about 4 ms. The communications controller may retransmit the transport block (e.g., a portion of the encoded data) when a NACK is received. The UE then combines the LLRs from the received retransmitted transport block with the stored LLRs from the previous received transmissions stored in soft buffer 415. The combined LLRs are then decoded by turbo decoder 425. The decoded performance of combined LLRs may be better than the performance when using just LLRs from one received transmission. Turbo decoding may be achieved using parallel processors.

Procedures and memory, such as soft buffers, at the UE side are used to support HARQ processes. An embodiment procedure is based on several concurrent stop and wait (SAW) processes. The HARQ processes are numbered, where the number of processes on a carrier depends on the frame structure type (e.g. frequency division duplex (FDD) or time division duplex (TDD)) of the carrier. For FDD, there may be up to eight HARQ processes per carrier. For TDD, the number of HARQ processes depends on the TDD configuration, and may include up to fifteen processes per carrier.

Figure 4:
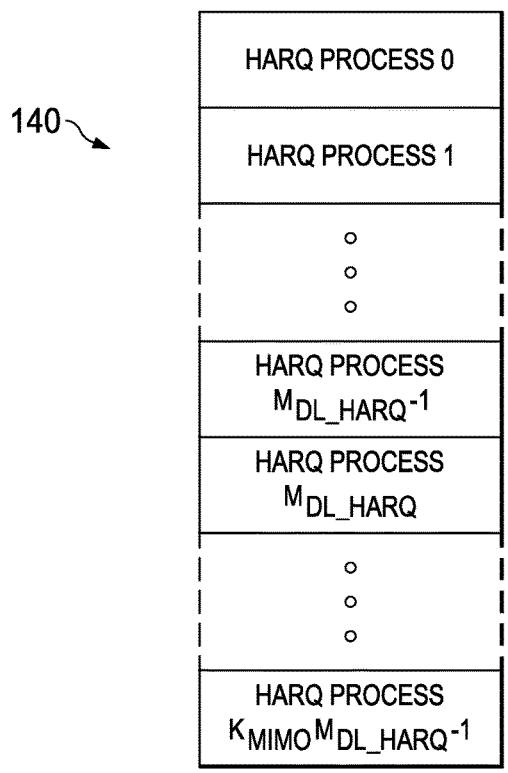
FIG. 4 illustrates an embodiment soft buffer.

FIG. 4 illustrates soft buffer 140, where MDL_HARQ is eight for FDD, and KMIMO is one or two. For each carrier, the soft buffer is divided equally among the HARQ processes. Because the UE configuration may allow up to two transport blocks (e.g. codewords) to be transmitted concurrently, the buffer for a particular HARQ process may be divided by the number of codewords. The HARQ process number (ID) may be used to identify which part of the soft buffer is used to store the LLRs for a particular HARQ process.

In cross-carrier transmission, a single user may be served by two or more carriers, with some carriers constantly available, while other carriers only sporadically available. It is desirable to continue transmission carried on one carrier by moving to a different carrier, for example when the initial carrier becomes unavailable. Cross-carrier mechanisms facilitate transitioning between multiple carriers.

The HARQ mechanism improves performance of a cellular communications system, for example by improving throughput and latency. HARQ relies on feedback of ACK/NACK messages between communicating parties. In Long Term Evolution (LTE), the HARQ feedback mechanism operates using multiple carriers. For example, the feedback indicators (i.e., ACK/NACK) for each HARQ process for each carrier may be fed back on one carrier. However, the HARQ processes themselves may be restricted to the carrier. It is desirable for the HARQ mechanism to be preserved, especially when working with opportunistic carriers. In a system with opportunistic carriers, retransmissions may occur on a different type of carrier than the initial transmission. For example, the initial transmission occurs on an opportunistic carrier, and a subsequent retransmission occurs on a licensed carrier. This may be because of interference coordination and avoidance, load balancing, shifting, or another factor.

Figure 5:
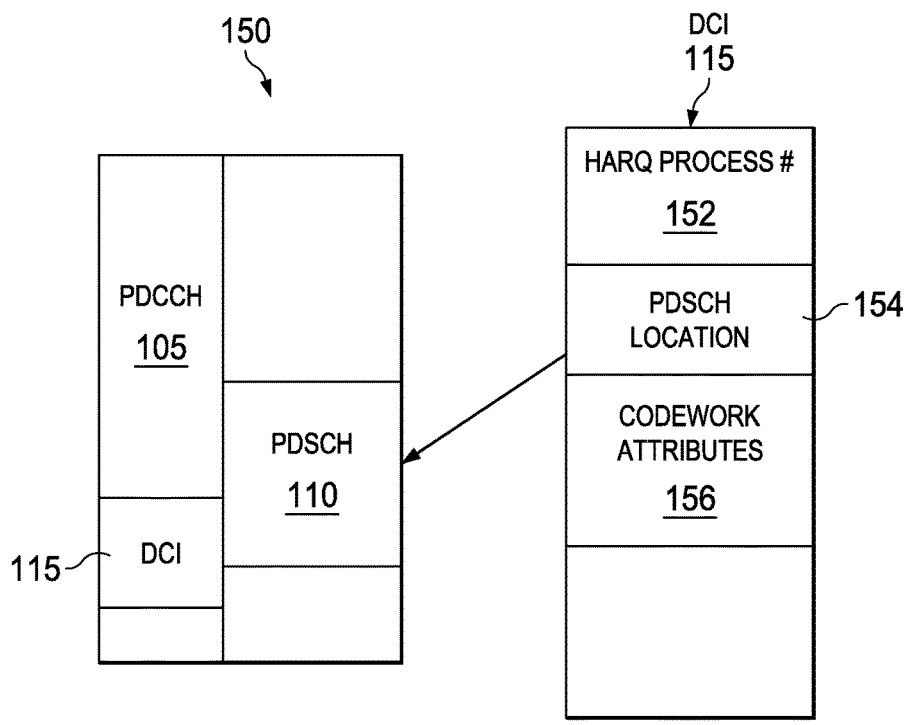
FIG. 5 illustrates an embodiment downlink control information (DCI)

FIG. 5 illustrates parameters 150 which are transmitted to the UE, for example using a physical downlink control channel (PDCCH) or an enhanced PDCCH (EPDCCH). The notation (E)PDCCH indicates either a PDCCH or an EPDCCH. The (E)PDCCH carries the downlink control information (DCI) for scheduling assignments for data transmission on the downlink for the physical downlink shared channel (PDSCH) 110 and resource grants for uplink transmissions on the physical uplink shared channel (PUSCH). The PDCCH carries encoded DCI 115 and is transmitted in control region 105 of a subframe, which may be in the first few symbols of a subframe. The EPDCCH may also carry a DCI. However, an EPDCCH is transmitted in the PDSCH or data region, facilitating frequency-domain coordination among communication controllers. The DCI may convey which resource block (RB) pairs are used for the transmission of the transport block. The DCI may indicate the starting location of the first RB pair and the number of RB pairs used. Additionally, the DCI may convey the HARQ process number for this transport block and the codeword attributes, including the modulation and coding scheme (MCS), the redundancy version (RV), and a new data indicator (NDI). DCI 115 contains HARQ process number 152, PDSCH location 154, and codeword attributes 156.

Figure 6A:
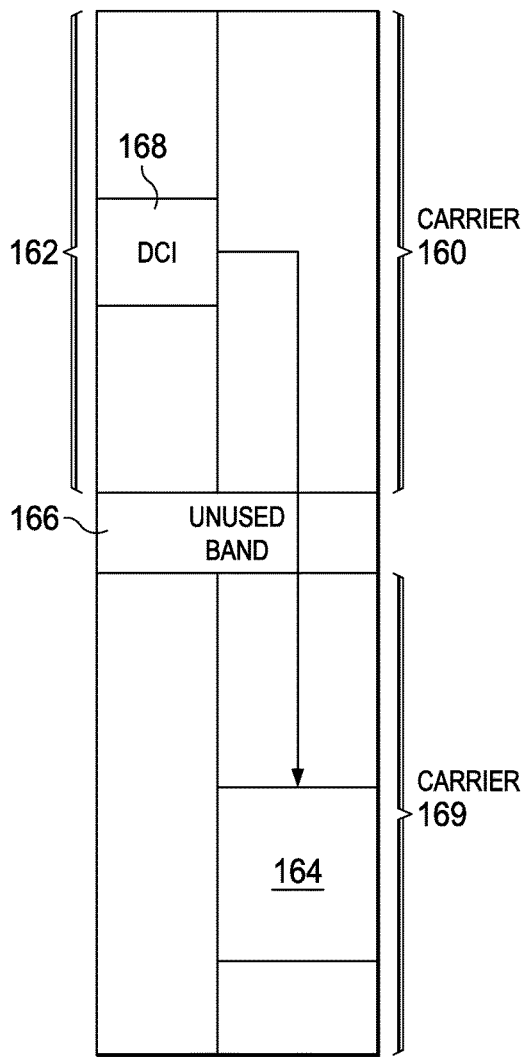
FIGS. 6A-B illustrate cross-carrier and single carrier scheduling.
Figure 6B:
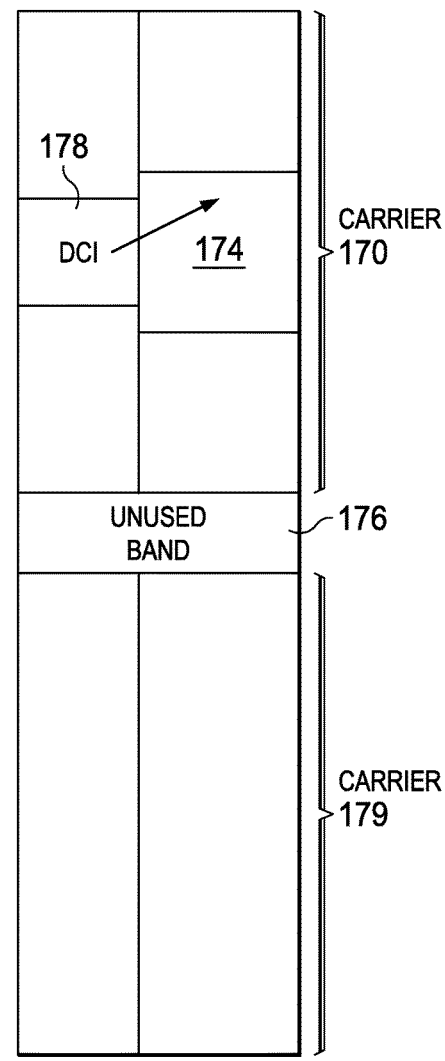

In cross-carrier scheduling, when at least two carriers are used, the data transmitted on one carrier is signaled on the other carrier, as illustrated in FIG. 6A. While the PDCCH is illustrated in FIG. 6A, an EPDCCH may also be used for carrying the DCI. Carrier 160 contains PDCCH 162 with DCI 168, which indicates scheduling information for transmission in data region 164 on carrier 169. DCI 168 contains an indicator of the carrier on which data is scheduled, which may be known as the carrier indicator field (CIF). Unused band 166 is between carrier 160 and carrier 169. The cross-carrier scheduling is part of a carrier aggregation (CA) mechanism. FIG. 6B illustrates DCI 178 in carrier 170, which points to data region 174 on carrier 170. There is no interaction between carrier 170 and carrier 179, with unused band 176 between carrier 170 and carrier 179.

Figure 7:
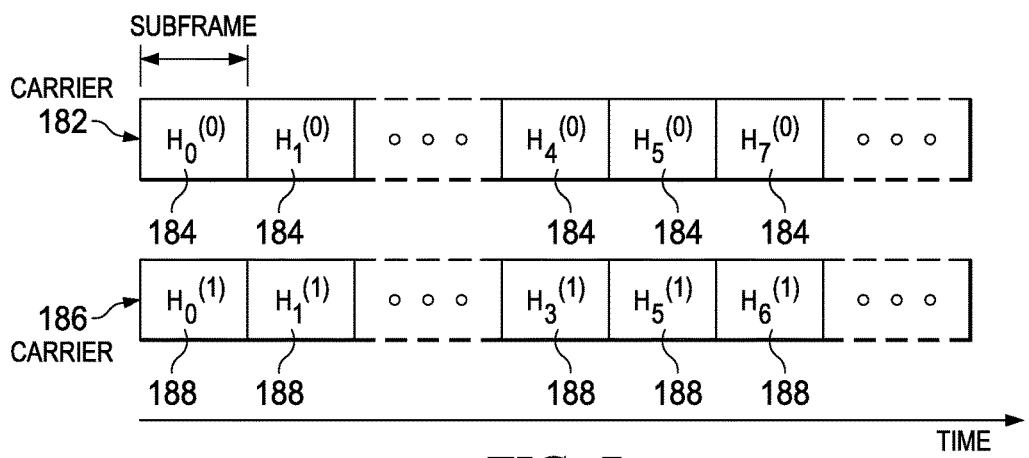
FIG. 7 illustrates HARQ processes on separate carriers.

In one example, scheduling HARQ processes across multiple carriers is not supported. When transmission of a HARQ process starts on one carrier, it stays on that carrier. Thus, data belonging to a specific HARQ process is only transmitted on the same carrier. FIG. 7 illustrates a HARQ process only transmitted on a single carrier. The superscript in parenthesis represents the initial carrier index and the subscript represents the HARQ process number. Processes initiated on carrier 182, which contains subframes 184, are transmitted on carrier 182. Similarly, processes initiated on carrier 186, which contains subframes 188, are transmitted on carrier 186.

Figure 8:
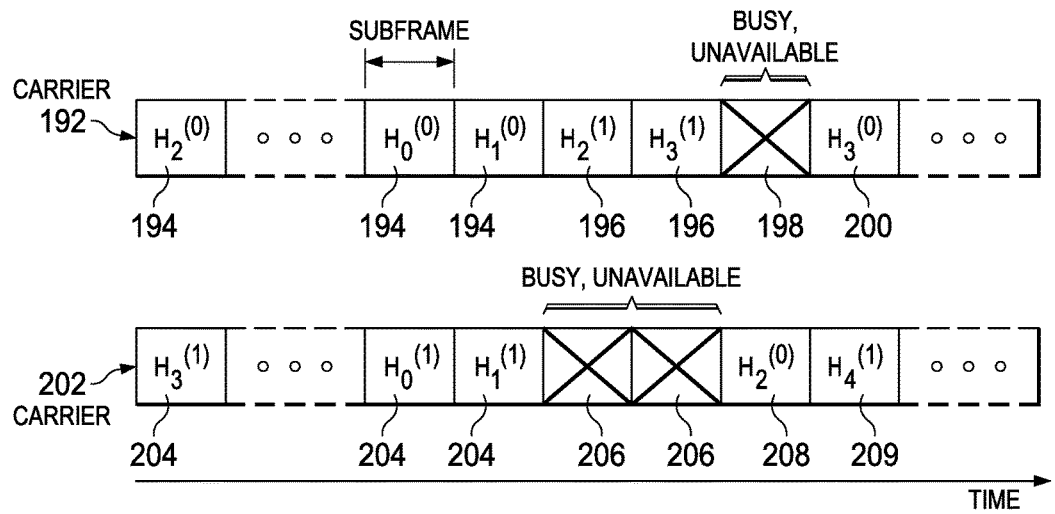
FIG. 8 illustrates HARQ processes across carriers.

When using opportunistic carriers, it is desirable that a single HARQ process is initiated on one carrier and continued on a different carrier, as illustrated in FIG. 8. Data associated with HARQ process Hn(0) is transmitted on carrier 192 (denoted as carrier 0 in the superscript) in subframes 194, while data associated with HARQ process Hm(1) is transmitted on carrier 202 (denoted as carrier 1 in the superscript) in subframes 204. In subframes 206, carrier 202 is busy or unavailable. HARQ process Hm(1) transitions to carrier 192, where the associated data is transmitted on subframes 196. For example, H2(1) is a retransmission of data associated with HARQ process 2 which started on carrier 1 but is now using carrier 0 in subframe 196. In subframe 198, carrier 192 is unavailable, and HARQ process Hn(0) is transitioned to carrier 202 in subframe 208. For example, H2(0) is a retransmission of data associated with HARQ process 2 that started on carrier 0 but is now using carrier 1 in subframe 208. Then, HARQ process Hn(0) resumes on carrier 192 in subframe 200, and HARQ process Hm(1) resumes on carrier 202 in subframe 209. With cross-carrier HARQ, the same HARQ process can be transmitted on both carriers interchangeably, depending on their availability.

In an example, mechanisms are introduced which are similar to cross-carrier HARQ (CC-HARQ), which may include retransmissions across cross carriers. In other words, a first transmission occurs on one carrier, and the retransmission occurs on a different carrier. HARQ processes may be scheduled and rescheduled among a number of carriers.

A number of different factors may be considered in cross-carrier HARQ. The number of codewords which may be transmitted can vary from carrier to carrier due to different transmission modes used on those carriers. For example, one carrier may be configured for using a transmission mode supporting two codewords, while another carrier is configured for using a transmission mode supporting only one codeword. Also, the bandwidths of the carriers may be different. This may be problematic, especially when one transmission is performed on a carrier with a larger bandwidth than the current carrier. Additionally, there is a problem with termination of a HARQ process. For example, the part of the soft buffer associated with a given HARQ process may be flushed when the information is correctly decoded and delivered to higher layers or upon transmitting an ACK.

In one example, all carriers are FDD carriers having the same bandwidth. A variety of different DCI formats may be used for cross-carrier HARQ. Other DCI formats may also be used.

Figure 9:
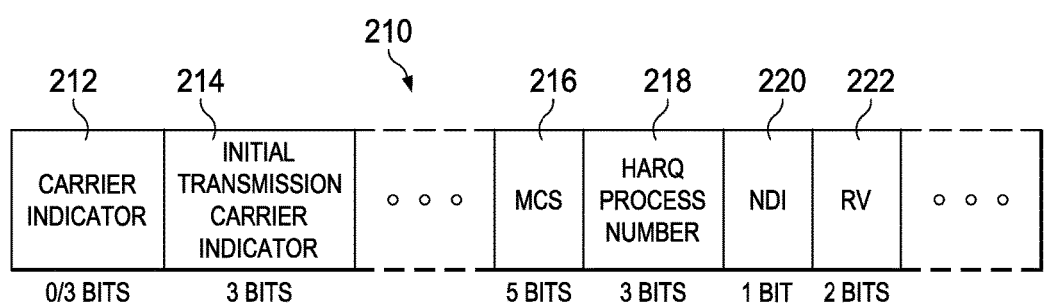
FIG. 9 illustrates another embodiment DCI.

DCI format 1A is a single codeword transmission format. In one example, bits are added which indicate the initial transmission carrier index of a given HARQ process in the DCI. FIG. 9 illustrates DCI 210. Carrier indicator field 212 contains either zero or three bits, and initial transmission carrier indicator (ITCI) 214 contains three bits. Also, MCS 216 has five bits, HARQ process number 218 has three bits, NDI 220 has one bit, and RV 222 has two bits. The initial transmission carrier indicator may have a different number of bits. With three bits, at most 64 HARQ processes may be identified, with eight processes on each of the eight carriers. The number of bits in the carrier indicator field depends on whether the UE supports cross-carrier scheduling for CA. The fields may be placed in a different order. In the first transmission, the initial transmission carrier indicator does not need to be signaled, because it is the same as the carrier indicator field when cross-carrier scheduling is on, or the same as the carrier on which the DCI is located when the cross-carrier scheduling is off. This ITCI field uses relatively few bits, but makes the DCI size variable, depending on whether a transmission is the first transmission or a retransmission.

Figure 10:
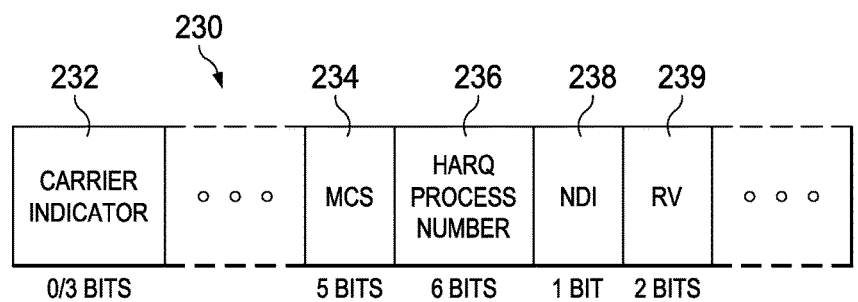
FIG. 10 illustrates an additional embodiment DCI.

In another example, the HARQ process number is extended by adding bits so more processes are indicated in a single field, as illustrated by DCI 230 in FIG. 10. DCI 230 includes carrier indicator field 232, which has zero or three bits, MCS 234 with five bits, HARQ process number 236 with six bits, NDI 238 with one bit, and RV 239 with two bits. HARQ process number 236 has six bits, which is an increase of three bits, but another number of bits, such as four, five, seven, eight, or nine may be used, depending on the number of HARQ processes supported. With three additional bits, at most 64 HARQ processes are identified. Each carrier may have a subset of possible HARQ process identifiers it may use. There may be a mapping relationship between the augmented HARQ process number, the HARQ process number from legacy systems, and the carrier. For example, the augmented HARQ process number is equal to the sum of the HARQ process number on a particular carrier and the product of the maximum number of HARQ processes per carrier and the carrier number associated with the carrier. Thus, the same soft buffer management may be used. Not signaling the ITCI field for the initial transmission may improve the signal-to-noise ratio (SNR). However, the presence or absence of the ITCI field makes the size of the DCI variable, which may increase the complexity for blind detection.

Adding new bits to the DCI may cause backward compatibility and performance issues. Thus, it may be useful to reuse some bits in the retransmission, considering that some transmission parameters are static or do not change much between retransmissions. Such parameters may be signaled in the first transmission, and not during retransmissions. For example, when a retransmission occurs after the communications controller received a NACK from the UE, the UE already knows the MCS of the initial transmission because the UE was able to decode the DCI and access the initial transport block size (ITBS) and number of physical resource blocks (NPRB). The ITBS is related to the MCS.

In an example, when the communications controller does not receive a response to the latest transmission (neither a NACK nor an ACK), it repeats the transmission with similar DCI parameters as the previous transmission. The RV value may be changed, which is signaled explicitly in the DCI and known to the receiver, facilitating combining current and previous transmissions of the ongoing data block.

There may be errors in feedback, for example when a communications controller determines that a NACK was received when an ACK was actually transmitted for a HARQ process, the communications controller would start or continue the retransmission for that HARQ process. In one example, a communications controller misinterprets a NACK as an ACK. The communications controller should receive a NACK, but the communication controller determines an ACK due to errors which cannot be detected within the physical (PHY) layer. Thus, the misinterpretation may be resolved using higher layers, such as the radio link control (RLC).

On the other hand, when the communications controller should receive an ACK, but due to an error determines that it has received a NACK, the communications controller can retransmit data for that HARQ process, and the RV may be altered.

Figure 11:
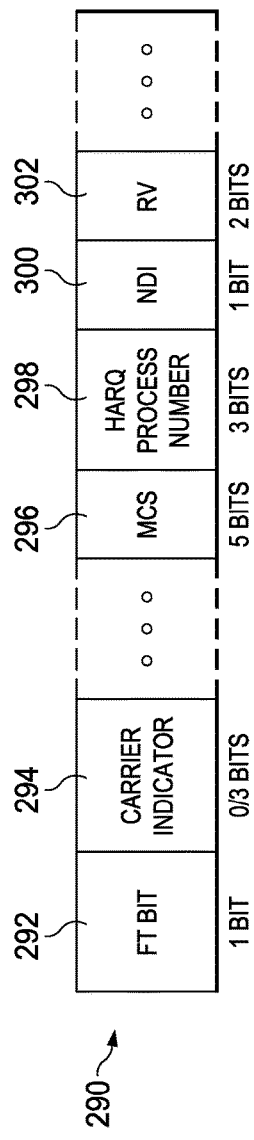
FIG. 11 illustrates another embodiment DCI.

FIG. 11 illustrates DCI 290, which includes a field related to CC-HARQ. DCI 290 includes first transmission (FT) bit 292, carrier indicator field 294, which has zero or three bits, MCS 296, which has five bits, HARQ process number 298, which has three bits, NDI 300, which has one bit, and RV 302, which has two bits. In TDD transmissions, HARQ process number 298 has four bits. FT bit 292 has a predefined value, for example 1, for the initial transmission. Also, the CC-HARQ mechanism is enabled on higher layers, such as the radio resource control (RRC) signaling, and not on the DCI level.

Figure 12:
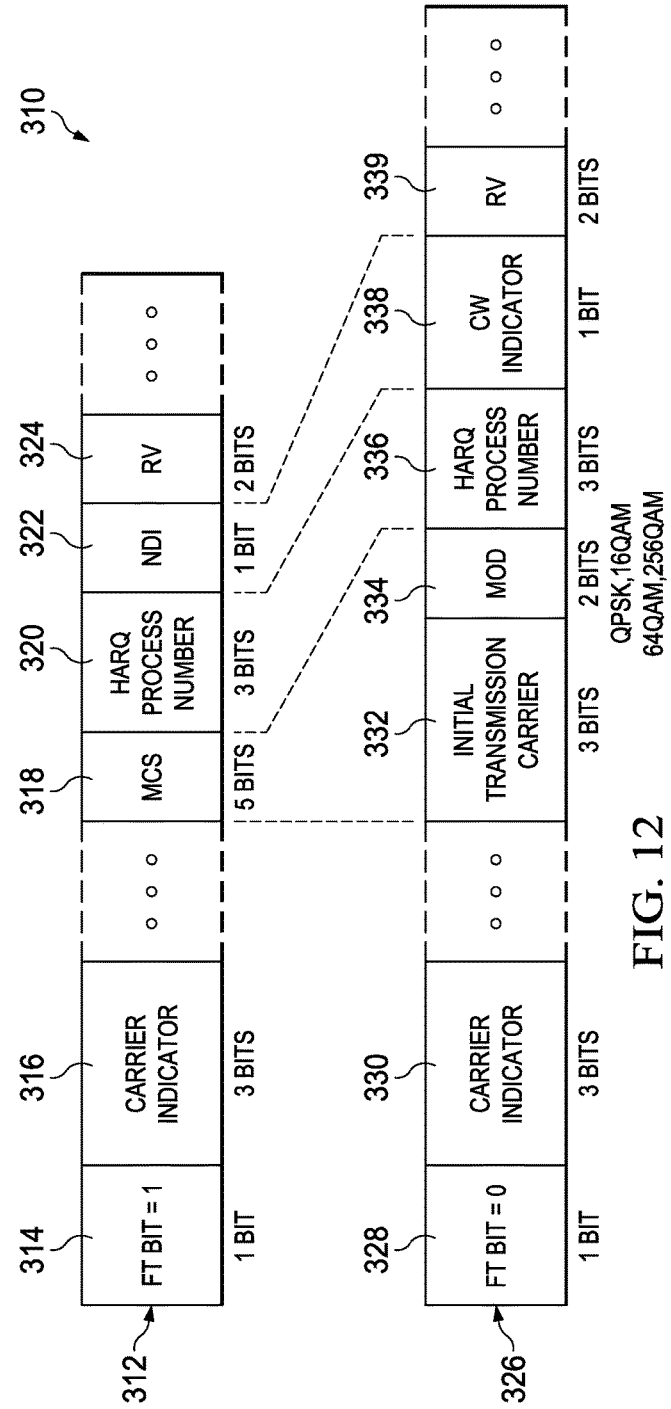
FIG. 12 illustrates embodiment DCIs for initial and subsequent transmissions.

The DCI fields may be redefined during retransmission when CC-HARQ is enabled and the FT bit is set to a different value. FIG. 12 illustrates DCI fields 310, where DCI 312 shows the format for the initial transmission and DCI 326 shows the format for subsequent retransmissions. In one example, the FT bit is 1 for the initial transmission and 0 for subsequent retransmissions. In another example, the FT bit is 0 for the initial transmission and the FT bit is 1 for subsequent retransmissions. DCI 312 includes FT bit 314, which has one bit, and equal to 1, carrier indicator field 316, which has three bits, MCS 318, which has five bits, HARQ process number 320, which has three bits, NDI 322, which has one bit, and RV 324, which has two bits. In TDD transmission, HARQ process number 320 has four bits. DCI 326 contains FT bit 328, which is set to 0. Like DCI 312, DCI 326 contains FT bit 328, carrier indicator field 330, HARQ process number 336, and RV 339. In TDD, HARQ process number 336 has four bits. However, instead of MCS 318, the MCS field in DCI 326 is split into two fields, initial transmission carrier indicator 332, which is three bits, and modulation (MOD) field 334, which is two bits, and represents quadrature phase-shift keying (QPSK), 16 quadrature amplitude modulation (QAM), 64 QAM, or 256 QAM. The modulation format is included because it is used in demodulation. Other MCS information, such as code rate, is not necessary during retransmission because it may be inferred from the MCS from the initial transmission and the number of resource blocks. The UE is able to combine the initial transmission with the retransmission data when a single HARQ process is moved from one carrier to another. Also, instead of NDI 322, DCI 326 contains code word (CW) indicator 338, which is one bit. When the first transmission of the HARQ process is a part of multi-codeword transmission, the codeword indicator may be used during the retransmission to indicate which codeword belongs that the HARQ process ID. The NDI bit may be redefined to be a codeword indicator (CWI) during the retransmission to indicate which codeword of this HARQ process is being transmitted. When CWI=0, codeword 0 is retransmitted, and when CWI=1, codeword 1 is retransmitted. This applies when both codewords were initiated on different carriers having a common HARQ ID number. A separate HARQ ID per codeword may be used, and the codeword indicator may not be necessary.

In the current standards, the NDI bit may be toggled, where the NDI bit is assigned to the previous NDI XOR 1 for a new data block. Thus, the NDI bit and FT bit are related to each other, in that the NDI bit changes when the FT bit is set to 1. In general, bits do not need to be added to the DCI to signal the first transmission of a new data block. However, without extra bit(s), codewords might not be identified when moving from two codewords per carrier to one codeword per carrier.

There is a relationship between retransmission of data. The transmitter may know whether decoding has been attempted on a first transmission for HARQ process Hn(m), where n represents the process number on carrier m. When decoding has been attempted, the transmitter may split the MCS field in subsequent retransmissions. There are several reasons the transmitter might not receive an ACK/NACK from the receiver. In one example, the UE receives the DCI and attempts to decode the DCI, but the transmitted ACK/NCK is not received by the communications controller because the uplink control information (UCI) carrying the ACK/NACK has been lost (corrupted). In this example, when a UE transmitted an ACK, the decoded data may be forwarded to subsequent stages, such as the MAC or RLC. When a UE transmits a NACK, some or all of the LLRs corresponding to the received data are stored in the soft buffer. In another example, the UE might not have received the DCI, for example discontinuous transmission (DTX) may occur. In an additional example, the UE does not receive the DCI but, due to UCI rules, such as physical uplink control channel (PUCCH) format three, the UE transmits a NACK.

For the communications controller, when the UE has not received the DCI or the UE received the DCI, attempted decoding, and the ACK/NACK was not received, the communications controller proceeds as though there was no reception of the downlink data. Thus, the communications controller may continue HARQ process Hn(m) on the same carrier with the same HARQ process number and keep the FT the same; initiate a HARQ process n' on carrier m' (i.e., Hn'(m')) for the same transport block where carrier m and carrier m' may be the same carrier or different carriers, and set the FT bit to 1; or transition this HARQ process to another carrier m' (i.e., Hn(m')) and continue retransmission with the FT bit set to 0. When the UE has not received the DCI, but due to UCI rules, has transmitted a NACK, because there is an ambiguity between the NACK and the indication of no received DCI, the communications controller may rely on other information to determine the FT bit. For example, when the DCI (DCI x) for Hn(m) contains scheduling information for two codewords, and an ACK has been received for one of the codewords, the communications controller assumes that DCI x has been received. In another example, when DCI x is transmitted with a higher reliability (e.g., more power or a higher aggregation level) compared to another DCI (DCI y) on the same carrier, and a response was generated for DCI y (e.g., an ACK or an uplink transmission), the communications controller may assume that the DCI x was received with a high probability. When the communications controller is confident that DCI x was received, it may resume Hn(m), but change FT to zero. Otherwise, the communications controller may continue the HARQ process Hn(m) and keep FT at 1. When the communications controller is unsure about whether the UE received DCI x, a new HARQ process may begin, or the same HARQ process may continue for the same carrier using FT=1.

Figure 13:
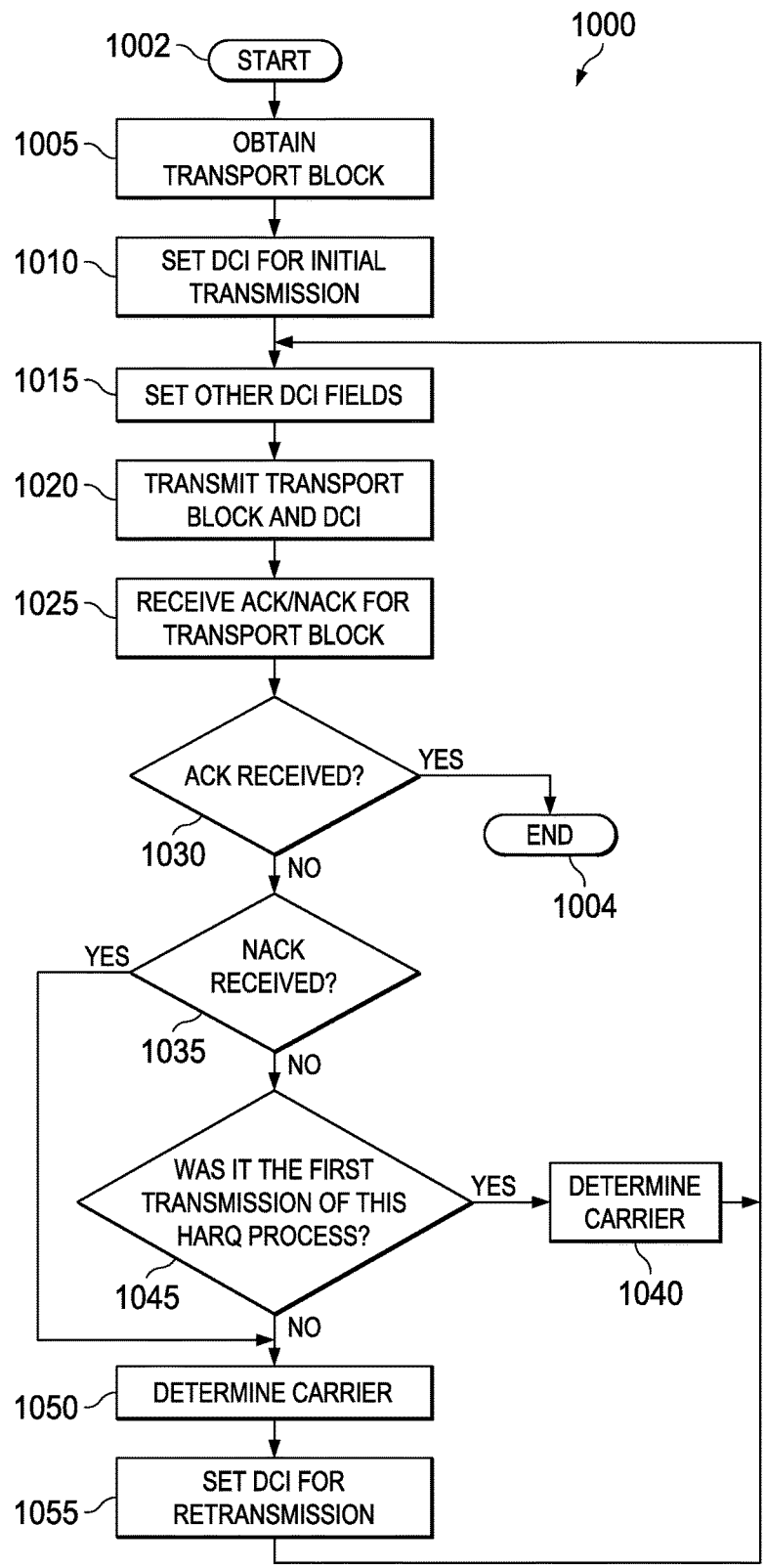
FIG. 13 illustrates a flowchart of an embodiment method of cross-carrier HARQ performed by a communications controller.

FIG. 13 illustrates flowchart 1000 for a method of cross-carrier HARQ performed by a communications controller. Initially, in step 1002, the method begins.

Then, in step 1005, the communications controller obtains a transport block for transmission to a UE.

Next, in step 1010, the communications controller sets some fields of the DCI specifically for the first transmission on a carrier. For example, the FT bit may be set to 1, the NDI bit may be toggled, the HARQ process number may be assigned, and the MCS may be assigned.

Then, in step 1015, the communications controller sets additional DCI fields, both for the initial transmission and for subsequent retransmissions. For example, the RV value is set. In the first transmission, the RV value may be set to zero.

In step 1020, the communications controller transmits the DCI and data to the UE in a subframe. The DCI and the data may be transmitted on different carriers.

Then, in step 1025, the communications controller waits to receive a response, such as an ACK or a NACK for the transport block in a future subframe. In one example, an ACK is represented by a 1 and a NACK is represented by a 0. Alternatively, an ACK is represented by a 0 and a NACK is represented by a 1.

In step 1030, the communications controller determines whether an ACK has been received. When an ACK is received, the communications controller ends this HARQ process in step 1004, and prepares for the transmission of another transport block. The HARQ process may end for other reasons, such as when the number of retransmissions for a transport block exceeds a threshold. On the other hand, when an ACK is not received, the communications controller proceeds to step 1035.

In step 1035, the communications controller determines whether a NACK has been received. When a NACK has not been received, the communications controller proceeds to step 1045, and when a NACK has been received, the communications controller proceeds to step 1050.

In step 1045, the communications controller determines whether this is the first transmission of the process, for example by examining the FT bit. When this is the first transmission of this HARQ process, and the FT bit is 1, the communications controller proceeds to step 1040. When this is not the first transmission of this HARQ processes, the FT bit is 0, and the communications controller proceeds to step 1050.

In step 1040, the communications controller selects a carrier for retransmission, which may be the same carrier or a different carrier. Then, it proceeds to step 1015 to set fields in the DCI for the retransmission. The FT value remains 1.

In step 1050, the communications controller selects a new carrier for retransmission. This may be the same carrier or a different carrier.

Then, in step 1055, the communications controller sets the DCI for retransmission. For example, the FT bit may be set to 0, and the MCS may be split. Then, the communications controller proceeds to step 1015 to set the additional DCI fields. The communications controller may also transmit the first transmission indicator to the UE using higher layer signaling.

Figure 14:
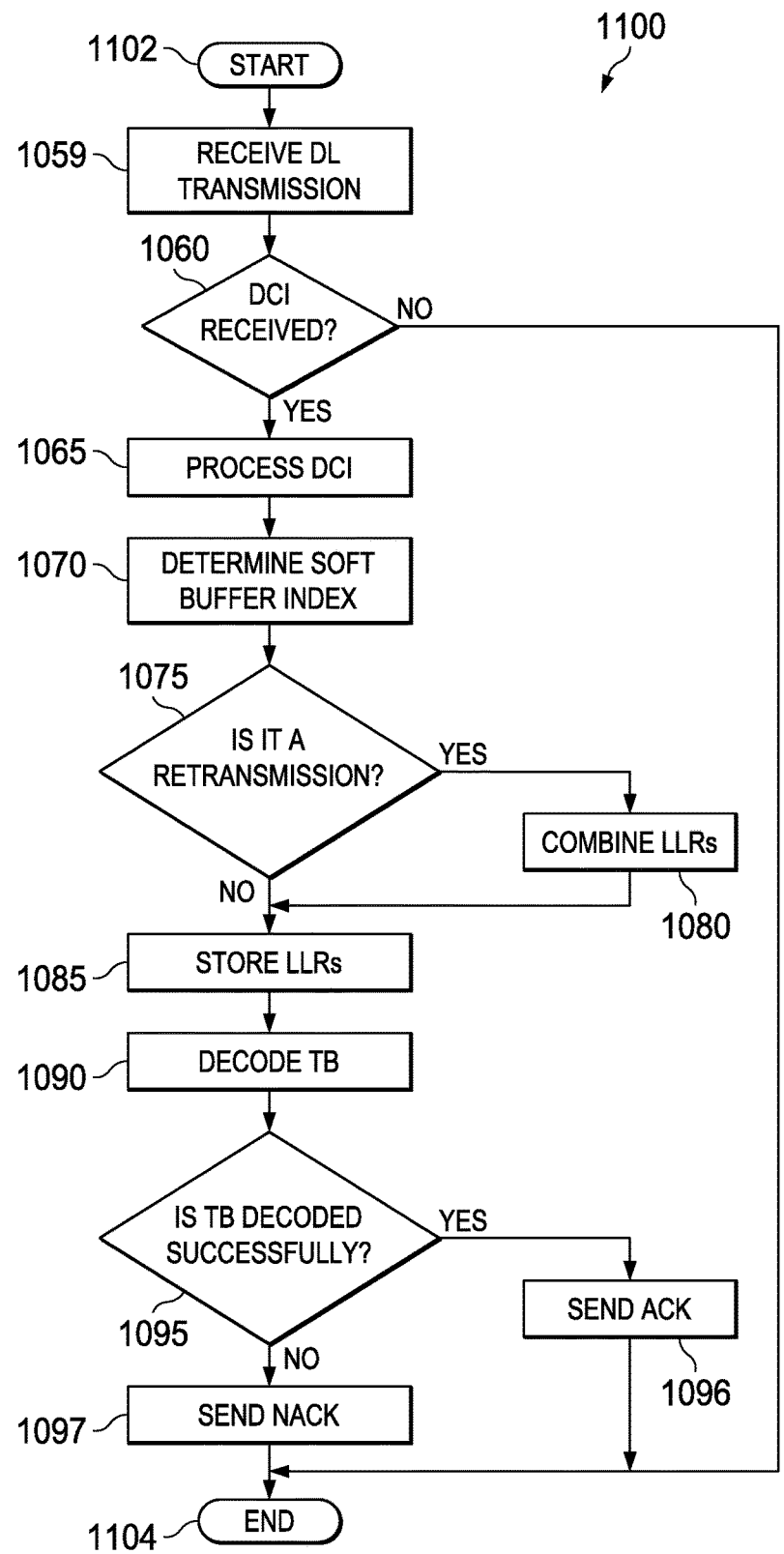
FIG. 14 illustrates a flowchart of an embodiment method of cross-carrier HARQ performed by a user equipment (UE)

FIG. 14 illustrates flowchart 1100 for a method of cross-carrier HARQ process performed by a UE. Initially, in step 1102, the method starts.

Then, in step 1059, the UE receives a downlink transmission from a communications controller in the beginning of a subframe. The transmission may span multiple carriers.

Next, in step 1060, the UE examines the received transmission to determine whether there is a DCI for downlink data on the (E)PDCCH. A DCI is considered not to be received when it is received but not successfully decoded. When the UE receives a DCI, it proceeds to step 1065. On the other hand, when the UE does not receive a DCI, it ends in step 1104. The UE may not perform any action, for example it may not receive data on the downlink. In some formats, such as CA and PUCCH, the UE may transmit a NACK to the communications controller. Also, the UE may be configured by receiving the first transmission indicator of the DCI using higher layer signaling.

In step 1065, the UE processes the fields of the received DCI. For example, the UE may process the DCI in accordance with the FT bit.

Then, in step 1070, the UE selects a soft buffer to use. That is, the UE selects an index for the soft buffer. The soft buffer is selected in accordance with the information in the DCI, such as the carrier and HARQ process number. The soft buffer index and retransmission are determined based on the FT bit. For example, when the FT bit is 1 and the NDI bit changed for the HARQ process number, the received data is for a first transmission. The soft buffer index is based on the HARQ process number and the carrier indicated by the CIF for cross-carrier scheduling, or based on the carrier itself for self-scheduling.

In step 1075, the UE determines whether the DCI is for a retransmission. When the FT bit is 1 and the NDI bit did not toggle for this HARQ process, the received data is a retransmission. However, it is possible that the UE did not store any LLRs corresponding to this process. When the UE did not store any LLRs, the DCI is considered to be for an initial transmission, and when the UE stored LLRs, the DCI is considered to be for a retransmission. When the FT bit is 0, the UE views the received data as a retransmission, and processes the stored DCI information corresponding to this HARQ process number to determine the soft buffer index, the TBS, and other information. The UE also determines how to generate the LLRs, MCS, and TBS for subsequent retransmissions. When the DCI is for a retransmission, the UE proceeds to step 1080. When the DCI is not for a retransmission, the UE proceeds to step 1085.

In step 1080, the UE combines the received LLRs with the LLRs stored in the soft buffer.

In step 1085, the LLRs whose buffer was determined in step 1070 are stored in the soft buffer.

Next, in step 1090, the transport block is decoded. The LLRs are processed by the channel decoder.

Then, in step 1095, the UE determines whether the codeword has been decoded correctly (i.e. whether the CRC passes). When the codeword has been successfully decoded, the UE proceeds to step 1096, and transmits an ACK to the communications controller. On the other hand, when the codeword has not been successfully decoded, the UE proceeds to step 1097 to transmit a NACK to the communications controller. In both cases, the procedure ends in step 1104.

Cross-carrier HARQ may be supported by higher layer signaling, such as RRC signaling. When cross-carrier HARQ is disabled, the FT bit might not be transmitted in the (E)PDCCH. In another example, the FT bit is transmitted, and the FT bit is constant. For example, the FT bit is set to 1. Alternatively, the FT bit is set to 0.

Other techniques may be used to signal the subsequent retransmission. In one example, the CRC parity sequence is masked with a certain sequence or sequences, depending on the functionality. CRC masking may be performed using radio network temporary identifiers (RNTI). RNTI is a generic term for an identifier for a UE when an RRC connection exists. There are a variety of types of RNTI, including cell RNTI (C-RNTI), paging RNTI (P-RNTI), system information RNTI (SI-RNTI), random access RNTI (RA-RNTI), and temporary RNTI (T-RNTI). The FT bit value depends on the masking sequence used to mask the RNTI, for example 0x0000 and 0x0001. In another example, additional masking is performed in accordance with the FT bit. This may be especially useful when the number of new bits, and therefore test sequences, is not large. The function of sequences may be performed by a reserved subset of RNTI indicators.

Figure 15:
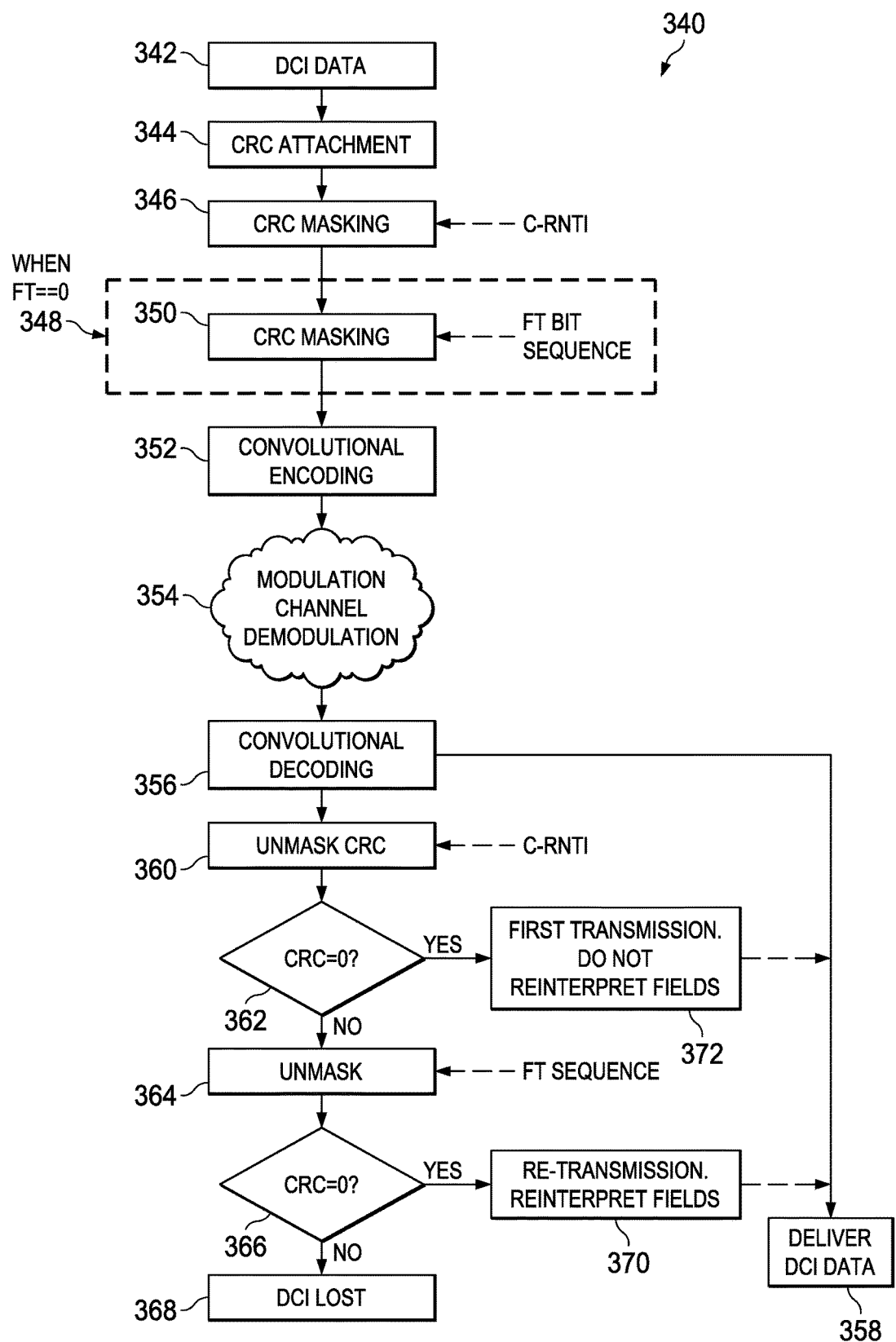
FIG. 15 illustrates a flowchart for an embodiment method of masking.

FIG. 15 illustrates flowchart 340 for a method of CC HARQ using masking. The communications controller first applies C-RNTI masking, and then applies a first transmission mask (first tx sequence) before encoding. Initially, in step 342, a communications controller obtains DCI data.

Next, in step 344, CRC attachment is performed to the DCI data.

Then, in step 346, CRC masking is performed using the C-RNTI. The C-RNTI may be a network specific temporary indicator. Masking is used to convey the first transmission sequence.

When FT=0, step 348 is performed. In step 348, CRC masking is performed in step 350. The CRC masking is performed using the FT bit sequence.

In step 352, convolution encoding of the DCI is performed.

Next, in step 354, first modulation then transmission through a channel and then demodulation is performed. The data and DCI are transmitted by the communications controller to the UE.

Then, in step 356, convolution decoding of DCI is performed. Convolutional decoding may be performed by Viterbi decoding, for example in hardware.

DCI is delivered in step 358.

Also, CRC processing is performed on the decoded DCI produced in step 356 to produce a syndrome. The CRC syndrome is unmasked in step 360. Unmasking reverses the process of masking, for example by applying the masking procedure in Boolean algebra to the masked sequence using an XOR operation. The XOR operation is commutable. This unmasking is performed using the C-RNTI.

Next, in step 362, the UE determines whether the unmasked CRC syndrome is equal to zero. An unmasked CRC syndrome of zero indicates that the data is correct, and that the masking sequence was a C-RNTI. When the unmasked CRC syndrome is equal to zero, the UE proceeds to step 372. An unmasked CRC syndrome not being equal to zero indicates that either the CRC syndrome might have been masked with another sequence or that the decoded output is incorrect. When the unmasked CRC syndrome is not equal to zero, the UE proceeds to step 364.

In step 372, the UE determines that this is the initial transmission, and does not re-interpret the DCI fields. The DCI data is delivered in step 358.

In step 364, the UE performs unmasking again, this time using the FT bit sequence. Unmasking reverses the process of masking, for example by applying the masking procedure in Boolean algebra to the masked sequence using an XOR operation.

Next, in step 366, the UE determines whether resulting CRC sequence is equal to zero. A resulting CRC sequence not equal to zero indicates that the DCI has not been correctly decoded. When the resulting CRC sequence is not equal to zero, the UE proceeds to step 368, and determines that the DCI has been lost (or not received). A resulting CRC sequence equal to zero indicates that a retransmission together with field re-interpretation occurs. When the resulting CRC sequence is equal to zero, the UE proceeds to step 370.

In step 370, the UE determines that the transmission is a retransmission. It reinterprets the DCI fields accordingly, and the DCI is delivered in step 358.

In another example, unmasking is first performed with the FT sequence, and then with the C-RNTI. FT masking is performed right after C-RNTI masking. When the FT bit is 0, the retransmission occurs. When the FT bit is 1, no masking is performed.

Other techniques may be used to indicate the first transmission. For example, the information may modulate the demodulation reference signal (DMRS), for example using a cover code. When the DMRS is customary, the FT bit is 1, otherwise the FT bit is 0. When the FT bit is 0, reinterpretation of fields occurs.

In another example, the first transmission signal is connected to the RV value. RV is set to 0 for the first or initial value, and other values indicate retransmissions. The FT bit functionality is carried by the RV values.

Figure 16:
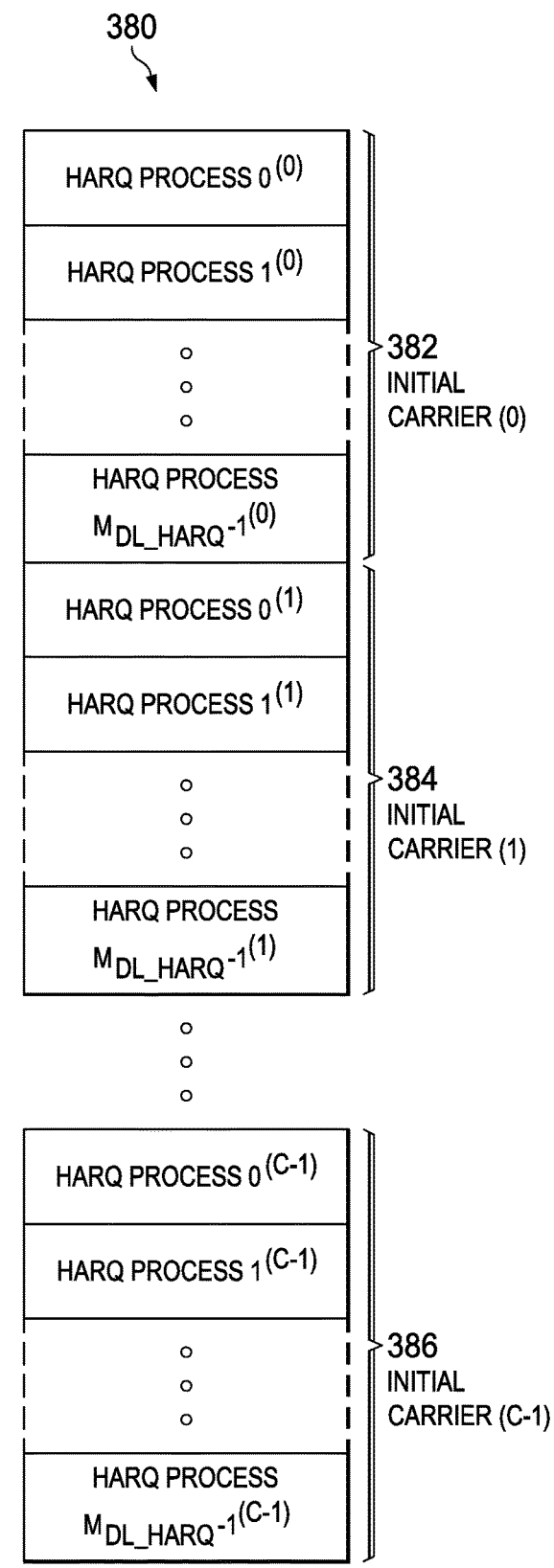
FIG. 16 illustrates another embodiment soft buffer.

The LLRs gathered from the first transmission and from retransmissions are stored at the UE in a soft buffer. The soft buffer is divided into blocks corresponding to a given transport block information. FIG. 16 illustrates soft buffer 380, a soft buffer for CC-HARQ using DCI format 1A. The memory is divided into equal size blocks indexed by the initial transmission carrier and the HARQ process number. Initial carriers include initial carrier 382, initial carrier 384, and initial carrier 386. The soft buffer includes MDL_HARQ*C non-overlapping memory regions, where C is the number of carriers in the system on which the HARQ process may be initiated.

An embodiment utilizes the dependence between retransmission blocks. It is desirable for the transmitter to know whether the first transmission has been successfully received by the recipient, for deciding whether to split the MCS field. When the transmitter does not receive either an ACK or a NACK, the UE has not received the data, and the DCI is lost, or the UE attempted to decode the data, but the ACK/NACK transmitted from the receiver was lost. When the transmission was not successful, the transmitter may continue the HARQ process by repeating the process of the initial transmission, and initiate it on the same carrier or on a different carrier, or it may start a completely new HARQ process. When the ACK/NACK is lost, the transmitter may continue the HARQ process and repeat the first transmission on the same carrier or switch to a new carrier, but not start a new HARQ process, because there is a chance that the initial transmission was received by the UE. Starting a new process is inefficient and may lead to complications.

Figure 17:
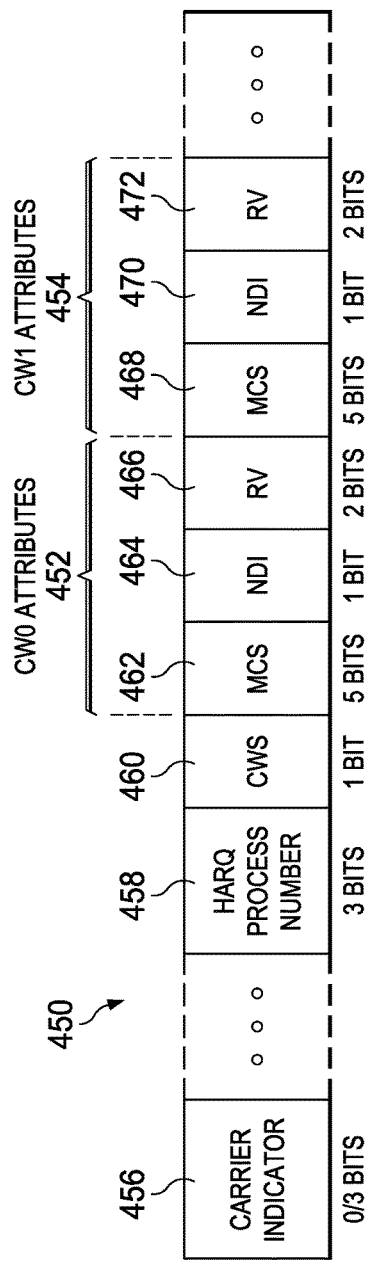
FIG. 17 illustrates an additional embodiment DCI.

DCI format 2 supports multi-codeword transmissions. FIG. 17 illustrates DCI 450 for multiple codewords. In one example, two codewords are supported, both belonging to the same HARQ process number. DCI 450 includes carrier indicator field 456, which has zero or three bits, HARQ process number 458 which has three bits, and codeword swap (CWS) 460 which has one bit. DCI 450 includes codeword 0 attributes 452 and codeword 1 attributes 454. Codeword 0 attributes 452 include MCS 462, which has five bits, NDI 464 which has one bit, and RV 466 which has two bits. Similarly, codeword 1 attributes 454 includes MCS 468, which has five bits, NDI 470 which has one bit, and RV 472 which has two bits. However, it may be desirable to support codeword separation. The codewords may be signaled with a separate HARQ ID field for each codeword.

Figure 18:
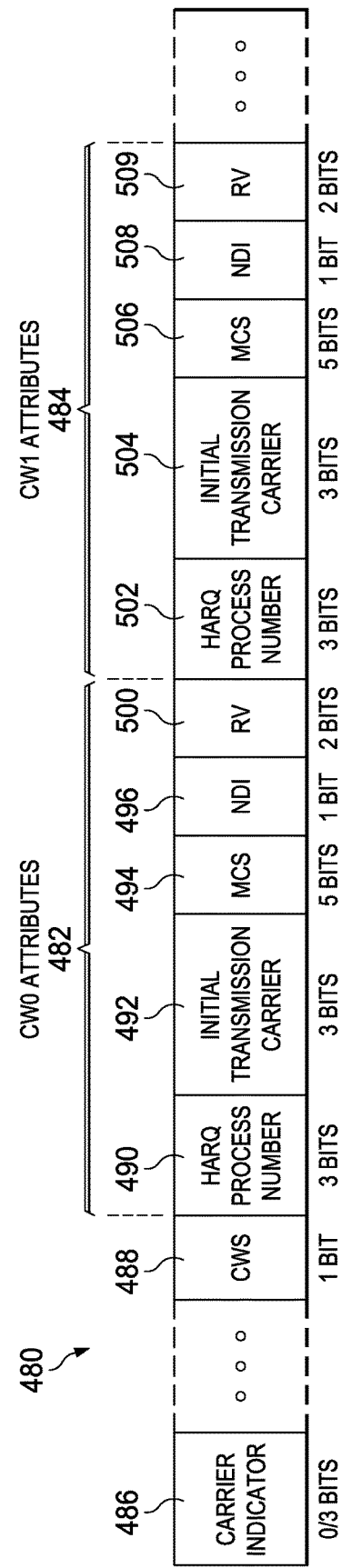
FIG. 18 illustrates another embodiment DCI.

In one example, codewords are scheduled independently to introduce an initial transmission carrier with a HARQ process number for each individual codeword. FIG. 18 illustrates DCI 480 with one HARQ process number per codeword. DCI 480 includes carrier indicator field 486, which has zero or three bits, CWS 488, which has one bit, codeword 0 attributes 482, and codeword 1 attributes 484. Codeword 0 attributes 482 includes HARQ process number 490, which has three bits, initial transmission carrier 492 which has three bits, MCS 494 which has five bits, NDI 496 which has one bit, and RV 500 which has two bits. Similarly, codeword 1 attributes 484 includes HARQ process number 502 which has three bits, initial transmission carrier 504 which has three bits, MCS 506 which has five bits, NDI 508 which has one bit, and RV 509 which has two bits. This DCI format increases the number of bits by nine.

Allocating a HARQ process ID per codeword increases the number of bits. For example, for FDD, up to eight HARQ processes are supported, and, when labeling each codeword with a separate ID, there are up to 16 HARQ process numbers with 4 bits each. This adds two bits, one per codeword. FIG. 19 illustrates DCI 510 which has two added bits, one bit per codeword. DCI 510 includes carrier indicator field 516 which has zero or three bits, CWS 518 which has one bit, codeword 0 attributes 512, and codeword 1 attributes 514. Codeword 0 attributes 512 include HARQ process number 520 which has four bits, initial transmission carrier 522 which has three bits, MCS 524 which has five bits, NDI 526 which has one bit, and RV 528 which has two bits. Similarly, codeword 1 attributes 514 includes HARQ process number 530 which has four bits, initial transmission carrier 532 which has three bits, MCS 534 which has five bits, NDI 536 which has one bit, and RV 538 which has two bits. Adding an extra bit per HARQ process number potentially increases throughput, but involves 11 extra bits in the DCI.

Figure 20:
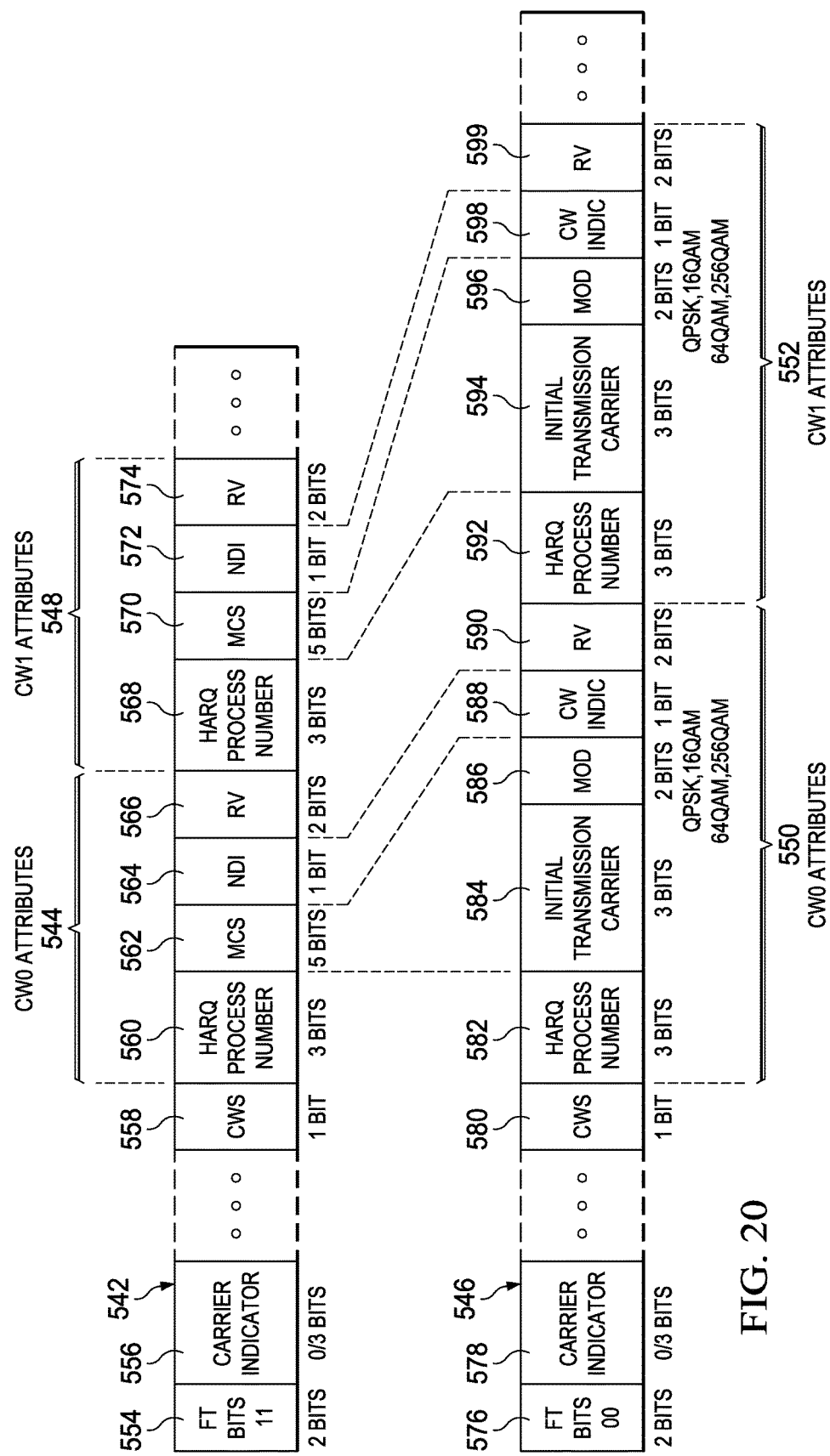
FIG. 20 illustrates embodiment DCIs for initial and subsequent transmissions.

In one example, fewer bits are added to the DCI. FIG. 20 illustrates DCIs supporting multiple codewords. DCI 542 includes FT bits 554 which have two bits, carrier indicator field 556 which has zero or three bits, CWS 558 which has one bit, codeword 0 attributes 544, and codeword 1 attributes 548. Codeword 0 attributes 544 includes HARQ process number 560 which has three bits, MCS 562 which has five bits, NDI 564 which has one bit, and RV 566 which has two bits. Similarly, codeword 1 attributes 548 has HARQ process number 568 with three bits, MCS 570 which has five bits, NDI 572 which has one bit, and RV 574 which has two bits. In DCI 542, FT bits 554 are equal to 11, representing an initial transmission, which is inherently on the initial carrier. DCI 546 includes FT bits 576, two bits which are set to 00, carrier indicator 578, which has zero or three bits, CWS 580 which has one bit, codeword 0 attributes 550, and codeword 1 attributes 552. Codeword 0 attributes 550 includes HARQ process number 582 which has three bits and RV 590 which has two bits. The MCS field is split, with three bits for initial transmission carrier 584 and two bits for modulation 586, representing QPSK, 16 QAM, 64 QAM, or 256 QAM. Also, NDI is replaced by CW indicator 588, which has one bit. Similarly, codeword 1 attributes 552 includes three bits for HARQ process number 592, three bits for initial transmission carrier 594, two bits for modulation 596, one bit for CW indicator 598, and two bits for RV 599. The FT bits include two bits, and may have the values of 11, 10, 01, and 00. One FT bit value indicates the initial transmission, while others indicate subsequent transmissions. This approach includes five bits, two for FT indication and three for separate HARQ ID process numbers. This mechanism may be applied to any number of codewords, with the DCI length increased accordingly. The NDI bit per codeword may be used to indicate the identification number of a codeword (0 or 1), which may have been previously initiated on a different carrier which has different characteristics. For example, the previous carrier may only support single codeword transmission.

The number of new bits added to the DCI to support two codewords in CC-HARQ may be at least five bits. FT bits may be signaled using CRC masking techniques. When C-RNTI is used to mask the CRC parity sequence of the DCI, the FT bits are set to 11. The other three combinations (00, 01, and 10) may be signaled by three reserved sequences.

In some examples, the number of bits in the DCI may be reduced with multiple codewords. When both codewords, and thus both HARQ processes, start on the same carrier, the ITCI field is common to both codewords. FIG. 21 illustrates DCI 620 where both codewords start on the same carrier. DCI 620 includes two FT bits 626, zero or three bits for carrier indicator field 628, one bit for CWS 630, three bits for initial transmission carrier 632, codeword 0 attributes 622, and codeword 1 attributes 624. Codeword 0 attributes 622 include one bit for CW indicator 640, two bits for RV 642, and either five bits for MCS 634 or three bits for HARQ process number 636 and two bits for modulation 638. Similarly, codeword 1 attributes 624 includes one bit for CW indicator 650, two bits for RV 652, and either five bits for MCS 644 or three bits for HARQ process number 646 and two bits for modulation 648. DCI 620 may be used when both codewords are always transmitted together. There are two FT bits instead of one FT bit, which is useful for when both codewords are initiated on the same carrier and can be separated when subsequent carriers support the same or fewer codewords as the initial carrier. For example, when the initial carrier has two codewords, a subsequent carrier may have only one codeword.

Figure 22:
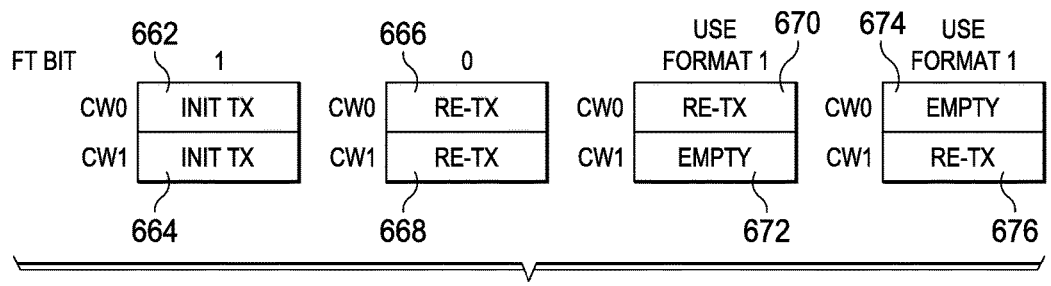
FIG. 22 illustrates embodiment codeword combinations.

In some examples, only certain two codeword transmissions are considered in a CC-HARQ mechanism. For example, within a transmission, one codeword is retransmitted and the other codeword is a first transmission. In one example, when a block is to be retransmitted, only one codeword is used for this block and the other dimension is left empty, for example by setting ITCI to zero and RV to 1, or by sending the retransmission with DCI format 1A and indicating the codeword by an NDI bit. FIG. 22 illustrates some codeword combinations. For example, a transmission includes initial transmission 662 for codeword 0 and initial transmission 664 for codeword 1. Another example includes retransmission 666 for codeword 0 and retransmission 668 for codeword. In an additional example, codeword 0 contains a retransmission 670 and codeword 1 is empty 672. Alternatively, codeword 0 is empty 674 and codeword 1 has retransmission 676. The HARQ process may finish before a new multi-codeword transmission is sent.

A format 2 DCI may be modified to the format 1A DCI for cross-carrier HARQ. The FT field includes a single bit, and three new bits are used to support CC-HARQ. The value of the FT bit may be indicated using a masking sequence or modulating a DMRS signal. In soft buffer management, each cell is further divided into a number of codewords supporting KMIMO, which may be two in LTE. The memory may be divided into C*MDL_HARQ*KMIMO regions of equal size.

There may be a large number of carriers. For example, there may be more than five carriers. Additional bits for the ICTI may be used to support a larger number of carriers.

Figure 23:
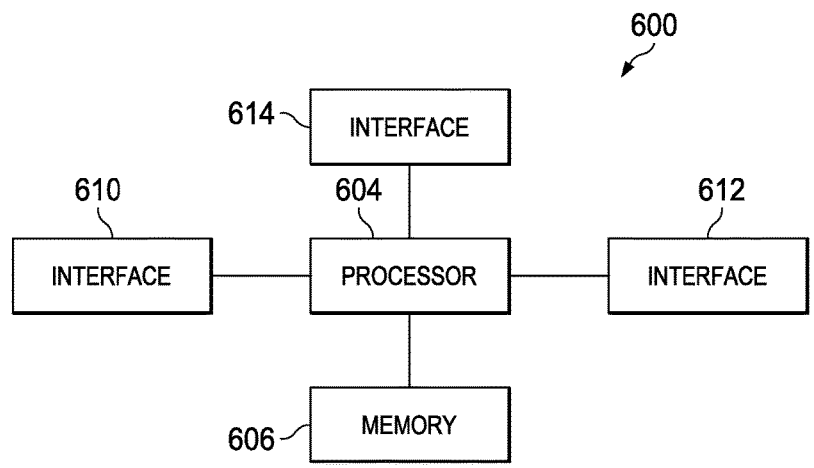
FIG. 23 illustrates a block diagram of an embodiment processing system.

FIG. 23 illustrates a block diagram of an embodiment processing system 600 for performing methods described herein, which may be installed in a host device. As shown, the processing system 600 includes a processor 604, a memory 606, and interfaces 610-614, which may (or may not) be arranged as shown in FIG. 23. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The interfaces 610, 612, 614 may be any component or collection of components that allow the processing system 600 to communicate with other devices/components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in FIG. 23, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 24:
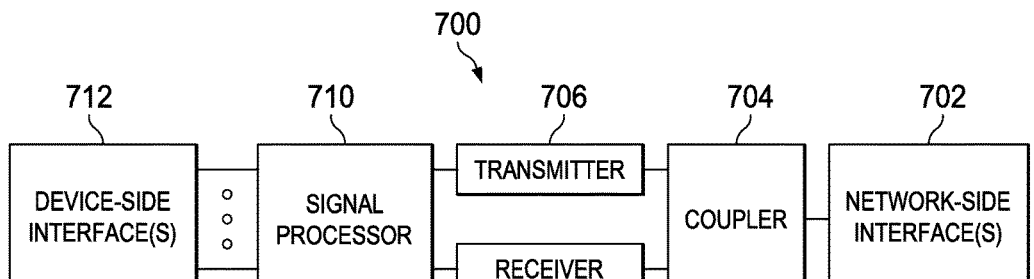
FIG. 24 illustrates a block diagram of an embodiment a transceiver.

In some embodiments, one or more of the interfaces 610, 612, 614 connects the processing system 600 to a transceiver adapted to transmit and receive signaling over the telecommunications network. FIG. 24 illustrates a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
   transmitting, by a communications controller to a user equipment (UE), a first data block on a first carrier;
   transmitting, by the communications controller to the UE, a first downlink control information (DCI) to initiate a hybrid automatic repeat request (HARQ) process associated with the first data block, wherein the first DCI comprises attributes of a first codeword and attributes of a second codeword;
   retransmitting, by the communications controller to the UE, the first data block;
   modulating a demodulation reference signal (DMRS) to produce a first transmission indicator; and
   transmitting, by the communications controller to the UE, a second DCI, wherein the second DCI comprises the first transmission indicator and an indicator of the first carrier, and wherein the second DCI continues the HARQ process, wherein the second DCI further comprises an initial transmission carrier indicator (ITCI), and wherein the ITCI applies to the first codeword and the second codeword.

2. The method of claim 1, further comprising selecting a selected carrier from the first carrier and a second carrier, wherein retransmitting the first data block comprises transmitting the first data block on the selected carrier.

3. The method of claim 1, further comprising:
   determining whether to retransmit the first data block, comprising determining whether the communications controller has received, from the UE, feedback corresponding to the first data block, and wherein retransmitting the first data block is performed upon determining to retransmit the first data block; and
   determining the first transmission indicator of the second DCI in accordance with the feedback.

4. The method of claim 1, wherein the first transmission indicator of the second DCI is different than a first transmission indicator of the first DCI.

5. The method of claim 1, further comprising performing cyclic redundancy check (CRC) masking on the second DCI using a first transmission (FT) bit sequence.

6. The method of claim 1, wherein the second DCI comprises a codeword indicator.

7. The method of claim 1, further comprising configuring the UE using higher layer signaling for monitoring the first transmission indicator.

8. A method comprising:
   receiving, by a user equipment (UE) from a communications controller, a first data block on a first carrier;

receiving, by the UE from the communications controller, a first downlink control information (DCI), wherein the first DCI comprises a first hybrid automatic repeat request (HARQ) process associated with the first data block, and wherein the first DCI comprises attributes of a first codeword and attributes of a second codeword;

receiving, by the UE from the communications controller, a second data block; and receiving, by the UE from the communications controller, a second DCI comprising a second HARQ process associated with the second data block, wherein the second DCI comprises a first transmission indicator and an indication of the first carrier, and wherein the second DCI further comprises an initial transmission carrier indicator (ITCI), wherein the ITCI applies to the first codeword and to the second codeword.

9. The method of claim 8, further comprising:
determining whether the second data block is a retransmission of the first data block in accordance with the second DCI; and
upon determining that the second data block is a retransmission of the first data block
combining the second data block and the first data block in accordance with the first HARQ process and the second HARQ process to produce a combined data block, and
decoding the combined data block.

10. The method of claim 9, wherein determining whether the second data block is a retransmission of the first data block comprises comparing a first HARQ process number of the first HARQ process to a second HARQ process number of the second HARQ process.

11. The method of claim 9, further comprising comparing the ITCI to the first carrier.

12. The method of claim 9, wherein combining the second data block and the first data block further comprises storing the first data block in a soft buffer in accordance with a first HARQ process number of the first HARQ process and the first carrier.

13. The method of claim 8, further comprising performing cyclic redundancy check (CRC) unmasking on the second DCI using a first transmission (FT) sequence.

14. The method of claim 8, wherein the second DCI comprises a codeword indicator.

15. The method of claim 8, wherein the first transmission indicator of the second DCI is different than a first transmission indicator of the first DCI.

16. The method of claim 8, further comprising receiving, by the UE from the communications controller, on higher layer signaling, a configuration for monitoring the first transmission indicator.

17. A communications controller comprising:
a processor; and
a non-transitory computer readable storage medium storing programming for execution by the processor, the programming including instructions to
transmit, to a user equipment (UE), a first data block on a first carrier,
transmit, to the UE, a first downlink control information (DCI) to initiate a hybrid automatic repeat request (HARQ) process associated with the first data block, wherein the first DCI comprises attributes of a first codeword and attributes of a second codeword,
retransmit, to the UE, the first data block,
modulate a demodulation reference signal (DMRS) to produce a first transmission indicator, and
transmit, to the UE, a second DCI, wherein the second DCI comprises the first transmission indicator and an indicator of the first carrier, and wherein the second DCI continues the HARQ process, wherein the second DCI further comprises an initial transmission carrier indicator (ITCI), and wherein the ITCI applies to the first codeword and the second codeword.

18. A user equipment (UE) comprising:
a processor; and
a non-transitory computer readable storage medium storing programming for execution by the processor, the programming including instructions to
receive, from a communications controller, a first data block on a first carrier,
receive, from the communications controller, a first downlink control information (DCI), wherein the first DCI comprises a first hybrid automatic repeat request (HARQ) process associated with the first data block, and wherein the first DCI comprises attributes of a first codeword and attributes of a second codeword,
receive, from the communications controller, a second data block, and
receive, from the communications controller, a second DCI comprising a second HARQ process associated with the second data block, wherein the second DCI comprises a first transmission indicator and an indication of the first carrier, and wherein the second DCI further comprises an initial transmission carrier indicator (ITCI), wherein the ITCI applies to the first codeword and to the second codeword.

* * * * *